United States Patent [19]

Ritter

[11] Patent Number: 4,752,851

[45] Date of Patent: Jun. 21, 1988

[54] OVERLOAD PROTECTION FOR SERIES RESISTANCES OF ELECTRIC MOTORS, ESPECIALLY OF FANS OF VEHICLES DRIVEN BY ELECTRIC MOTORS

[75] Inventor: Bernhard Ritter, Pforzheim-Eutingen, Fed. Rep. of Germany

[73] Assignee: Dr. Ing. h.c.F. Porsche Aktiengesellschaft, Fed. Rep. of Germany

[21] Appl. No.: 911,750

[22] Filed: Sep. 26, 1986

[30] Foreign Application Priority Data

Sep. 27, 1985 [DE] Fed. Rep. of Germany ....... 3534500

[51] Int. Cl.⁴ .............................................. H02H 5/00
[52] U.S. Cl. ....................................... 361/31; 361/33; 318/421
[58] Field of Search ................ 361/23, 24, 28, 31, 361/33; 707/9, 10 R; 318/421, 422; 323/354

[56] References Cited

U.S. PATENT DOCUMENTS

| | | | |
|---|---|---|---|
| 4,249,118 | 2/1981 | Roof | 318/422 X |
| 4,408,244 | 10/1983 | Weible | 361/24 |
| 4,430,682 | 2/1984 | Babsch | 361/31 |
| 4,611,154 | 9/1986 | Lambropoulos et al. | 361/23 X |

FOREIGN PATENT DOCUMENTS 1149104 4/1969 United Kingdom .

Primary Examiner—G. P. Tolin
Assistant Examiner—Derek S. Jennings
Attorney, Agent, or Firm—Barnes & Thornburg

[57] ABSTRACT

Overload protection for the series resistance of an electric motor in which a voltage drop across the electric motor is monitored. During the occurrence of a reduced voltage drop, for example, as a result of a blocking of the motor or of a fan driven by the electric motor, the series resistance is short-circuited by a relay so that the blocking can be overcome by an increased driving torque of the electric motor or a fuse in the load current input line to the motor responds. As a result thereof, an effective overload protection is created which is of simple construction, involves no additional wiring expenditure and requires few additional components and which also permits to dimension the series resistance for normal operating currents and to be able to dispense with a thermal monitoring.

9 Claims, 2 Drawing Sheets

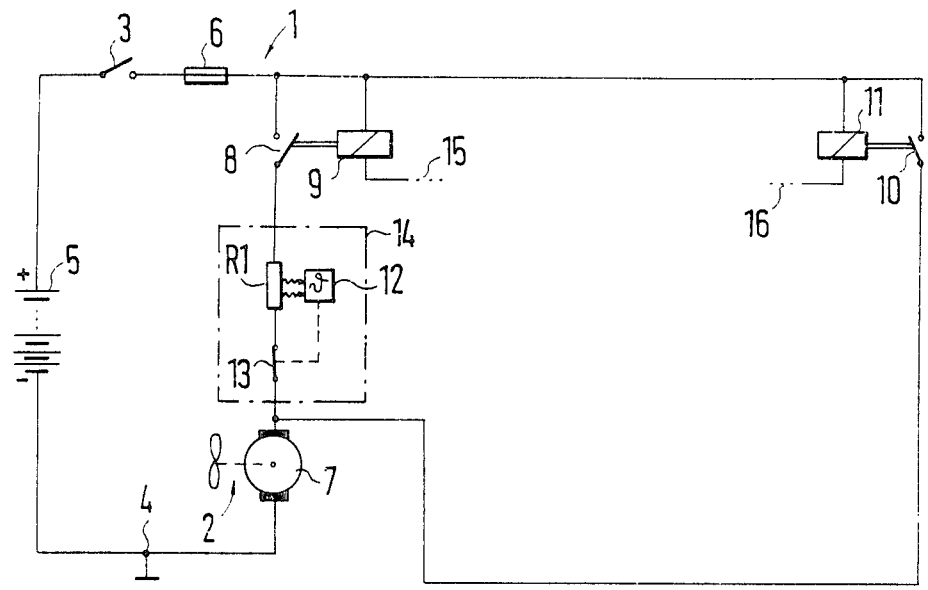
PRIOR ART FIG.1
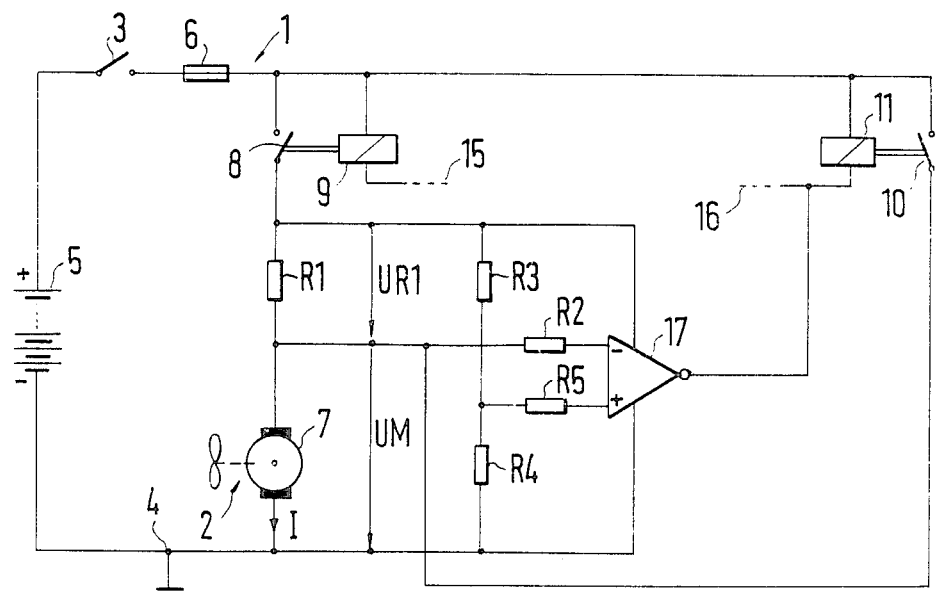
FIG.2

OVERLOAD PROTECTION FOR SERIES RESISTANCES OF ELECTRIC MOTORS, ESPECIALLY OF FANS OF VEHICLES DRIVEN BY ELECTRIC MOTORS

BACKGROUND AND SUMMARY OF THE INVENTION

The present invention relates to an overload protection for series resistances of electric motors, especially of fans of vehicles driven by electric motors.

Fans driven by electric motors are used to an ever-increasing extent for the forced ventilation of internal combustion engines, respectively radiators and passenger cells of vehicles, last by not least because they can be controlled relatively easily and require little driving energy. Thus, the heat balance of internal combustion engines can be regulated in an intended manner and the temperature, respectively, the rate of air flow in the passenger cell can be matched correctly to requirements.

However, frequently the wish exists, especially for reasons of the noise emission, to reduce the rotational speed of the fans in periods of reduced air requirement. As a rule, series or dropping resistances are utilized for that purpose, by means of which a single step or multi-step speed reduction can be achieved or a continuously variable speed reduction can be achieved by means of continuously variable series resistances.

Conditioned on principles, the series resistances are constructed of low-ohmic value and must be able to withstand a considerable thermal load. In case the fan is blocked, for example, by the entry of foreign bodies into its operating area or by a short-circuit at or in the electric motor, this may lead to an excessive heat-up and therewith eventually to a destruction of the series resistance without the occurrence of a response of the fuse in the current supply to the fan because the flowing excess-current is limited in part by the series resistance itself.

As solution to this problem, customarily the series resistances are either over-dimensioned or they are monitored by means of a thermal switch and are disconnected from the current supply.

Considerable additional costs as well as accommodation and heat removal problems are disadvantageous with the first solution. The second solution is also cost-intensive; additionally disadvantageous with the second solution is an adequate heat transfer from the resistance to the thermal switch which can be achieved only with great difficulty because both parts must be electrically insulated from one another at least within certain areas, which again implies a poor heat transfer.

A protective arrangement for starting resistances of motors against overload is discussed in the German Pat. No. 558,872. In this prior art circuit, a relay-controlled bridging of the resistance is also provided. However, the bridging does not serve the protection of the resistance during the blocking of the motor but rather for taking the resistance limiting the starting current out of the current circuit of the motor after starting has taken place. The starting resistance is thus not bridged or by-passed when the motor stands still (blocked) but, in contrast thereto, is additionally connected into the circuit. However, as its function is completely different from that of a rotational speed-reducing series resistance, it must also be dimensioned completely differently, to mention yet another difference. For the protection of this starting resistance, a slow-blowing fuse is provided within the bridging or by-pass circuit, directly in series with the same. However, disadvantageous with this circuit is the fact that an additional fuse is necessary as also the fact that its place of installation is determined by the location of the starting resistance, respectively, of its bridging or short-circuiting circuit. Furthermore, it is of disadvantage that the circuit is no longer functional once the fuse has responded because more simple blocking occurrences which could be eliminated by a higher starting torque, cannot be released therewith (the starting circuit is always set into operation when accelerating from the standstill).

A protective circuit for a d.c. motor is disclosed in the DE-OS No. 27 36 724. This circuit provides a series resistance connected in series with the motor. The voltage drop, which occurs across this series resistance and is proportional to the motor current, is monitored. If this voltage drop exceeds a limit value, then a disconnect signal is fed by way of a time-delay element to a switching contact connected in series with the motor.

The series resistance mentioned in this prior publication thus serves pure measuring purposes and is not suited for the current limitation for purposes of rotational speed reduction. An electronic circuit connected with the same thus monitors the motor and not a series resistance. For that reason, it must also be dimensioned completely differently; furthermore, by reason of the peculiarities of the circuit, it must be constructed safe against short-circuiting. Thus, a further series resistance would have to be used for the rotational speed reduction which under circumstances would have to be monitored with a separate device.

It is therefore the object of the present invention to provide an overload protection for series resistances of electric motors, especially for fans of vehicles driven by electric motors with one or several series resistances for the rotational speed reduction, which avoids the aforementioned disadvantages of electro-thermal overload protections, recognizes an increased load at least in one of these series resistances and safely protects the same against overload or destruction.

The underlying problems are solved according to the present invention in that during the occurrence of an increased power dissipation in at least one of these series resistances, a rotational speed step with full power output is selectively rendered operable.

The advantages of the present invention reside primarily in that an overload protection for series resistances of electric motors, especially of fans of a vehicle driven by electric motors is created which recognizes an occurring overload at series resistances that may be caused, for example, by a blocking of the fan, and reliably protects the series resistances. This is achieved with simple and cost-favorable means; the components necessary therefor require little space, can be accommodated without problems in a fan control apparatus and require no additional wiring expenditure.

These and other objects, features and advantages of the present invention will become more apparent from the following description when taken in connection with the accompanying drawing which shows, for purposes of illustration only, two embodiments in accordance with the present invention, and wherein:

BRIEF DESCRIPTION OF THE DRAWINGS

FIG. 1 is a circuit diagram for a two-stage fan driven by an electric motor with monitoring of a series resistance by a thermal switch according to the prior art;

FIG. 2 is a circuit diagram similar to FIG. 1, but with an electronic monitoring of the series resistance according to the present invention;

DETAILED DESCRIPTION OF THE DRAWINGS

Figure 3:
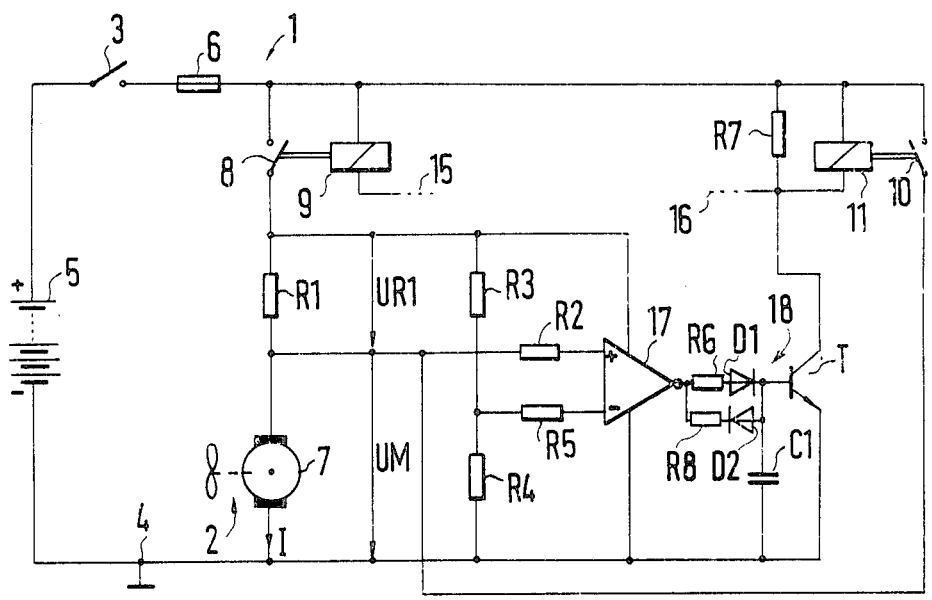
FIG. 3 is a circuit diagram according to FIG. 2, but equipped with an additional time delay element in accordance with the present invention.

Referring now to the drawing wherein like reference numerals are used throughout the various views to designate like parts, and more particularly to FIG. 1, reference numeral 1 generally designates a current supply circuit of a fan 2 driven by an electric motor 7 according to the prior art which is connected with a vehicle battery 5 by way of an ignition switch 3 and a vehicle ground 4. The current supply circuit 1 is protected by a fuse 6; the fuse 6 is so dimensioned that it permits for short periods of time the highest possible starting current IMA of the electric motor 7 of the fan 2 driven by an electric motor and permits continuously without responding at least the maximum permissive normal current IMN of the electric motor 7.

The electric motor 7 is connected with one terminal with the vehicle ground 4 and can be supplied with operating current, in each case by way of the fuse 6, either by way of a normally open contact 8 of a first relay 9 (fan stage I) in series with a series or dropping resistance R1 or directly by way of a normally open contact 10 of a second relay 11 (fan stage II).

For temperature monitoring, the series resistance R1 is provided with a thermal switch 12 which actuates a normally closed contact 13 in the current inlet or outlet line of the series resistance R1 and, as a rule, is accommodated together with the same in a common housing 14. The series resistance R1 and the thermal switch 12 are thereby to be in as good as possible a heat-conducting connection with each other.

Th control lines 15 and 16 of the first and second relay 9 and 11 (first and second fan stage) can be controlled thereby either directly by way of two thermal switches triggered at different temperature limit values of a cooling medium or by way of a temperature control logic also from a single thermal sensor and/or from other engine-specific or vehicle-specific parameters (not shown).

FIG. 2 now illustrates how the series resistance R1 can be better protected, respectively, more effectively protected against overload. A voltage drop UR1 across the resistance R1 can be utilized as measure for the power dissipation which occurs in the resistance R1; this can also take place by means of a voltage drop UM across the electric motor 7 which results from the difference of the overall voltage UM+UR1 across the series resistance R1 and the electric motor 7 and the voltage drop UR1 across the series resistance R1; the circuit can be further simplified thereby. The voltage drop UM across the electric motor 7 is coupled by way of a resistance R2 to an inverting comparator 17 and is compared by the same with a reference value that is obtained by way of a voltage divider R3 and R4 from the overall voltage UM+UR1 developed across the series resistance R1 and the electric motor 7 and serves simultaneously as operating voltage for the comparator 17; voltage fluctuations of the battery 5 are thus compensated. The reference value is fed to the comparator by way of a resistance R5. The output of the comparator 17 is connected with the second relay 11.

If the fan stage I is engaged (relay 9 energized), then the current flows from the battery 5 by way of the ignition switch 3, the fuse 6, the normally open contact 8 and the resistance R1 to the electric motor 7 and from there by way of the vehicle ground 4 back to the battery. During normal nominal operation of the fan stage I, the so-called electromotive force is effective at the motor terminals, in addition to a winding resistance, which conteracts (dependent on rotational speed) the operating voltage UM applied to the connections and thus virtually increases the internal resistance of the electric motor. By reason thereof, the voltage drop across the series resistance R1 is also relatively small as long as the motor runs. An example therefor can be seen from the following table in which the current input IM of the motor 7 is in amperes (A), the voltage drop UM across the motor 7 is in volts (V), the voltage drop UR1 across the series resistance R1 is in volts (V), and the power dissipation PR1 in the series resistance R1 is in watts (W).

TABLE

|  | IM(A) | UM(V) | UR1(V) | PR1(W) |
|---|---|---|---|---|
| Normal Operation Fan Stage I | 5.7 | 6.9 | 5.1 | 29.07 |
| Blocking Case Fan Stage II | 11.6 | 1.5 | 10.5 | 121.80 |
| Normal Operation Fan Stage II | 13.2 | 12 | 0 | 0 |

If now for any reason a blocking of the fan occurs in the fan stage I, then the electromotive force is zero; thus, only the (very small) winding resistance is now effective across the terminals of the electric motor 7. The input current IMB1 (blocking current) increases strongly, and nearly the entire operating voltage occurs across the series resistance R1; the power dissipation PR1 in the series resistance R1 increases strongly and can heat up the series resistance to such an extent that it is destroyed.

As can be seen from the Table. the input current IM is, however, still lower than with a nominal operation in the fan stage II so that the fuse 6 does not respond.

In FIG. 2, the voltage drop UM across the electric motor 7 is, however, permanently monitored. If it drops below the reference value estimated by the resistances R3 and R4, then the inverting comparator 17 sets into operation the fan stage II by way of the relay 11; the series resistance R1 is thus bridged or short-circuited. An increased starting torque is produced in the electric motor 7 by the higher current IMA (starting current!) flowing through the motor and not limited by the series resistance which in some cases may release a blocking action. After the starting has taken place, the voltage drop UM again rises so that the relay 11 again becomes de-energized and drops and the electric motor 7 again operates by way of the series resistance R1. If, however, the blocking continues (blocking current IMB2) or a short circuit exists in the current supply circuit, then the fuse 6 responds and breaks the circuit; the series resistance and other parts of the circuit are thus effectively protected.

The relay 11 can be connected either directly (FIG. 2) to the comparator, whereby the negative input in this case is connected with the resistance R2 and the positive with the resistance R5, as also by way of a time delay circuit 18 (FIG. 3) and a driver transistor T in a so-called active pull-down circuit; however, in that case the positive input is to be connected with the resistance R2 and the negative input with the resistance R5 (with non-inverting comparators the two signs are to be correspondingly reversed), see FIG. 3. The time-delay circuit consists in the most simple case of an R-C element R6 and C1 and the active-pull-down circuit of the transistor T and the pull-down resistance R7.

The operation can thereby be explained as follows: If a high-signal (voltage drop across the motor UM drops below the reference value) appears at the output of the inverting comparator 7, then the condenser C1 is charged by way of the resistance R6. If the voltage across the condenser C1 exceeds the base-emitter voltage necessary for the driver transistor T to become conductive, then the latter becomes conductive and pulls down the potential of the control line 16 which is at a positive potential, to approximately vehicle ground so that the relay 11 is energized. The time-delay effective by the R-C member R6 and C1 is so selected that the second relay 11 responds only when the voltage drop across the motor UM drops below the reference value over a predetermined time interval, and drops off again only when a second time interval has been exceeded which suffices for the starting, respectively, release of the blocking and to a subsequent acceleration to full speed of the electric motor 7. Response and drop-off time of the second relay 11 can additionally be selected differently if additionally a series circuit of a resistance R6 and of a diode D1 connected in the conducting direction is connected between the comparator 17 and transistor T, and if another series circuit of a further resistance R8 and of a diode D1 connected in the blocking direction is connected in parallel with the resistance R6 and the first diode D1.

It should be further noted that the monitoring circuit for the series resistance can be accommodated without problem in a control apparatus, respectively, in a relay housing at a central location (central electrical system) in the vehicle. Separate lines (measuring lines) to the engine, respectively, to the series resistance, need not be used because the output lines of the normally open contacts 8 and 10 of the relays 9 and 11 lead already to the corresponding measuring points. The monitoring circuit is thus extraordinarily simple in construction and therefore suited very well also for refitting vehicles.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An overload protection for series resistances of electric motors, comprising:
    an electric motor,
    current supply circuit means including a fuse selected for maximum operating current load and at least one series resistance means for reducing the rotational speed of the electric motor,
    the series resistance means being operable to be either interconnected or short-circuited by relay means for the control of different rotational speed stages, and
    further control means for establishing a rotational speed with full power output in response to an increased power dissipation in at least one of said series resistance means, wherein a voltage drop across the electric motor is used as the measure for the power dissipation, and for causing automatically a release of the blocking by an increasing starting torque of the electric motor or a response of the fuse by a blocking current of the electric motor.

2. An overload protection for series resistance of electric motors according to claim 1, wherein the electric motor is operable to drive a fan of a vehicle.

3. An overload protection for series resistances of electric-motor-driven vehicle fans, comprising current supply circuit means includes a fuse, an electric-motor-driven fan which is operable to be connected in the current supply circuit means in series with a series resistance means by way of a first relay means and directly into the current supply circuit means by way of a second relay means, a comparator means operable to compare a voltage drop across the electric-motor-driven fan with a reference value and means energizing the second relay means by the comparator means when the voltage drop across the electric-motor-driven fan drops below the reference value.

4. An overload protection according to claim 3, wherein an overall voltage which occurs across the series resistance means and the electric-motor-driven fan serves as current supply means of the comparator means and the reference value is obtained from this overall voltage by a voltage divider.

5. An overload protection according to claim 4, wherein the fuse is so selected that it can reliably cope with an increased starting current of the electric-motor-driven fan occurring for a short period of time without responding.

6. An overload protection according to claim 5, further comprising a time-delay circuit means connected in a control line between the comparator means and the second relay means whose time-delay is so selected that the second relay means responds only when the voltage drop across the electric-motor-driven fan drops below the reference value over a first time interval sufficient for the starting the electric-motor-driven fan and drops off again only when a blocking is released and the electric-motor-driven fan has accelerated the fuse has responded.

7. An overload protection according to claim 3, wherein the fuse is so selected that it can reliably cope with an increased starting current of the electric-motor-driven fan occurring for a short period of time without responding.

8. An overload protection according to claim 7, further comprising a time-delay circuit means connected in a control line between the comparator means and the second relay means whose time-delay is so selected that the second relay means responds only when the voltage drop across the electric-motor-driven fan drops below the reference value over a first time interval sufficient for the starting the electric-motor-driven fan and drops off again only when a blocking is released and the electric-motor-driven fan has accelerated the fuse has responded.

9. An overload protection according to claim 8, wherein said time delay means is an R-C element.

* * * * *